June 13, 1950 L. E. ZWOBODA ET AL 2,511,142
MEAT ROAST LIFTING APPLIANCE
Filed March 25, 1947
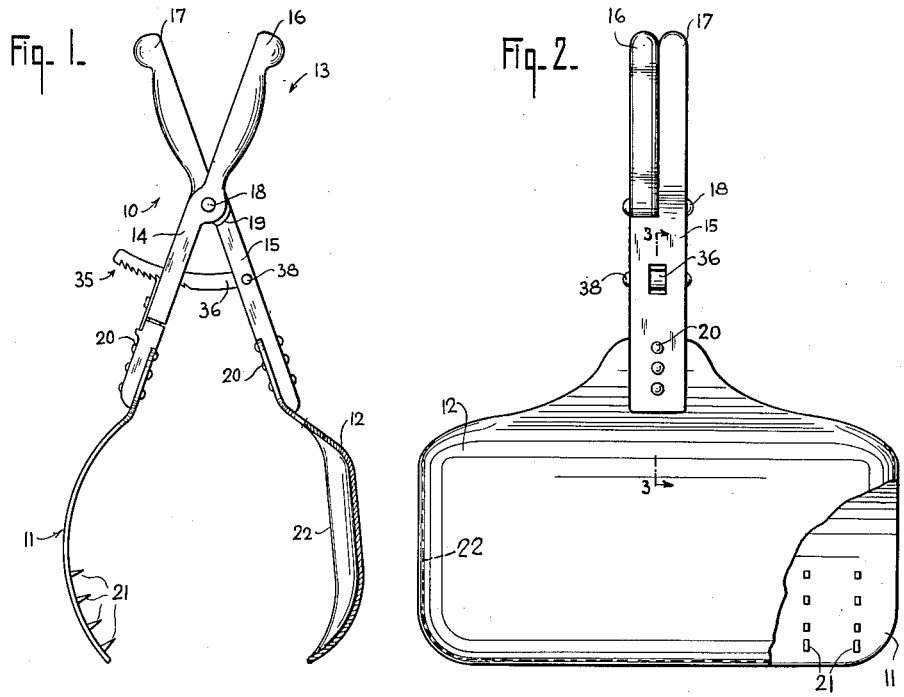
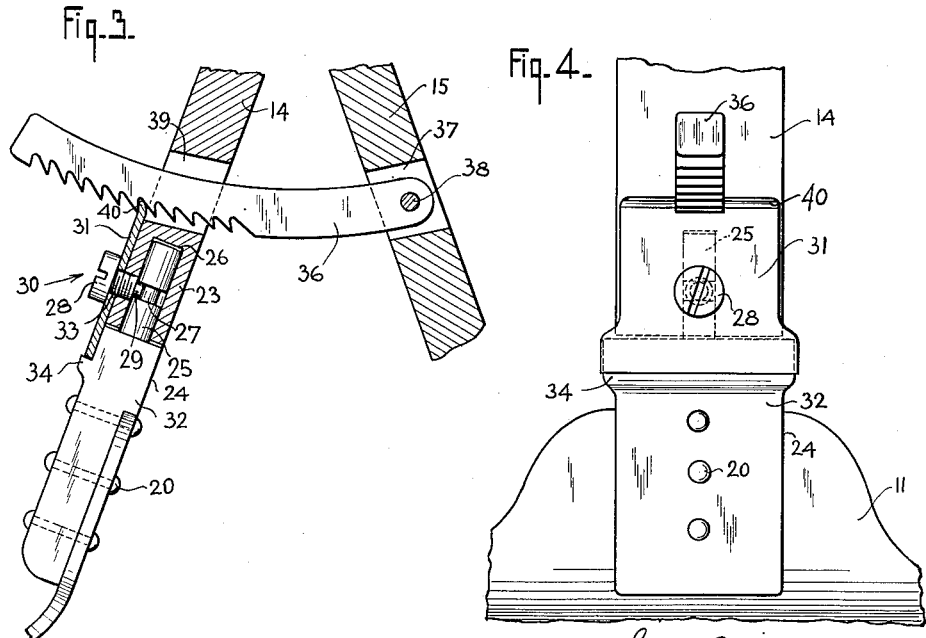
INVENTORS
Lena E. Zwoboda and
Arthur E. Zwoboda
BY
Louis Schumacher
ATTORNEY.

Patented June 13, 1950

2,511,142

UNITED STATES PATENT OFFICE 2,511,142

MEAT ROAST LIFTING APPLIANCE

Lena E. Zwoboda and Arthur E. Zwoboda, Bronx, N. Y.

Application March 25, 1947, Serial No. 736,926

5 Claims. (Cl. 294—106)

1

This invention relates to holding or lifting devices in the nature of a pair of tongs or the like.

One object of the invention is to furnish a device of the character described having improved means for lifting an article while gripping it according to the irregular or tapered contour of the article.

The utility of the invention is best exemplified in connections with the lifting and handling of a meat roast. The same has always presented a problem when the housewife attempts to remove it from the pan or other baking or cooking dish. She sometimes drops it because it is heavy and awkward to handle, and in placing it in a serving dish, splashing of the gravy often results. In attempting to furnish an appliance to facilitate the lifting and handling of the roast, difficulties have been encountered due to the fact that the meat must not be ripped, and hence must be fairly uniformly gripped along its tapering contour.

It is therefore an object of the invention to furnish an appliance of the nature set forth having improved means to facilitate the uniform gripping, lifting and handling of a roast, in removing the same from the baking or cooking dish, and in carefully placing the same in a serving dish.

Another object of the invention is to furnish a device of the type mentioned in which the roast is held against the possibility of any accidental slippage in any direction, and is nevertheless easily and readily released from the appliance without requiring assisting manipulation by a knife or fork.

Another object of the invention is the provision of a device of the nature set forth so arranged in an improved manner as to require the minimum of clearance with the said walls of the baking or cooking dish when the appliance is inserted to obtain a full and proper grip on the roast.

Another object of the invention is to provide an improved device of the class alluded to adapted for carrying the roast in a wholly safe manner without relying wholly upon the pressure between the jaws, and preferably without permitting the roast to produce drippings on the floor or table.

Other objects and advantages of the invention will become apparent as the specification proceeds.

With the aforesaid objects in view, the invention comprises the novel features, combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a view in side elevation showing an appliance embodying the invention.

Fig. 2 is a face view thereof in elevation.

Fig. 3 is an enlarged fragmentary view with parts of the mechanism in section.

Fig. 4 is a view in elevation of the structure of Fig. 3.

The advantages of the invention as here outlined are best realized when all of its features and instrumentalities are combined, but useful embodiments may be produced involving less than the whole.

It will be obvious to those skilled in the art to which the invention appertains, that the same may be incorporated in several different constructions. The accompanying drawing, therefore, is submitted merely as showing a preferred exemplification of the invention.

Referring in detail to the drawing, 10 denotes an appliance embodying the invention. The same includes the opposed jaws 11 and 12 and means 13 pivotally or swingably interconnecting the same. The means 13 may comprise bars or elongated arms 14 and 15 having their respective handles 16 and 17 and being pivotally interconnected at 18 in a secure and reliable manner as by a screw or rivet. There may be an offset construction at 19 similar to that which is furnished in the handles of a pair of scissors. By pressing the handles 16 and 17 toward each other, the jaws 11 and 12 are moved in a corresponding manner. These jaws may be rigidly mounted as by the rivets 20.

The jaw 12 is much more concave than the jaw 11 so that after the roast is gripped between the jaws, the device 10 may be tilted to a horizontal position so that the roast may be supported directly in the jaw 12. Consequently there is virtually no chance for the roast to slip out from between the jaws endwise or in any other manner, especially as the jaw 11 which is desirably somewhat curved, is formed with suitable projectiins 21 adapted to pierce into the meat and thus to hold it against sliding movement relative to the jaw 12. Preferably the jaws 11 and 12 are substantially elongated in the direction of the axis of the pivot 18 in order to secure therebetween a substantial part of the roast. Without being limited thereto, the jaw 12 may have end walls 22 of any suitable shape so that this jaw in effect forms a shallow container for the roast, and such container is desirably imperforate. By reason of the concave nature of the jaw 12, it may be preferred to make the length of the jaw 11 somewhat less than that of the jaw 12 to facilitate insertion into a baking or cooking dish for the roast, without requiring undue clearance of the side walls of the dish.

The handle bar 14 is preferably split or otherwise formed to provide a plurality of sections 23, 24, interconnected for rotational or angular movement about the axis longitudinal to the bar 14. The section 24 may be the one to which the jaw 11 is secured, and this section may have a stub shaft 25 fitted in a bore 26 of the section 23. These sections may be suitably interconnected in any feasible manner as by the provision of an annular groove 27 in the shaft 25, a set screw 28 secured in the section 23 having a point portion 29 engaged in the groove 27 to prevent accidental separation of the sections 23 and 24. Accordingly, the jaw 11 is adapted for movement about an axis at right angles to the pivot 18 so as to allow for the tapering form of the roast. While the jaw 12 may also be movable in this manner, it is preferred that one of the jaws be rigid on its handle bar in order to avoid that undue degree of flexibility which may lead to ac-accidental dropping of the roast. In the particular embodiment shown, it is preferred that the part 12 shall be the relatively rigid jaw, especially as it is adapted to serve as a shallow container or support in which the roast may lie in a horizontal and well supported manner.

While the angular movement of the jaw 11 about its secondary axis or connection 30 may be limited, as by the provision of suitable stop means, it is preferred to proceed further and to provide yielding or resilient means for automatically restoring the jaw 11 to an initial position in which the opposed jaws lie along parallel horizontal lines. This will facilitate the insertion of the appliance into the baking or cooking pan for the roast, without permitting the jaw 11 to swing to a position in which it may constitute an obstruction with the side wall of the pan. According to one embodiment, there may be a flat strip spring 31 secured to the section 23 and overlying or snugly engaging the transversely widened boss 32 on the section 24. The spring 32 may have a hole at 33 to receive the set screw 28 which holds the same and thus performs a dual function. The boss 32 may have a raised portion 34 to abut a lower edge of the spring 31 in order to prevent this spring from turning around the screw 28. The arrangement is such that the section 24 may be turned by the jaw 11, whereby the boss 32 causes deflection of one or another of the side portions of the plate spring 31, the latter yieldingly causing the jaw 11 to return to initial position after the roast has been removed from the appliance 10. The spring 31 may be of any desired size or shape to accomplish its intended purpose.

Any suitable releasable locking device 35 may be provided to hold the appliance in locked position on a roast. Illustratively, this locking device may comprise a rack member 36 received in a slot 37 of the handle bar 15 and pivotally connected thereto at 38. This rack member passes through a slot 39 in the handle bar 14. The spring 31 may extend into proximity to the member 36 so that an adjacent edge portion of the spring forms a strong and accurate surface portion 40 for engaging the teeth of the member 36. The portion 40 may be so laterally outwardly bent as to form a doubly secured locking engagement with the rack member. The latter may automatically readily fall into locking position as the handles 16 and 17 are pressed together, and if the device 10 is then swung to a horizontal position or otherwise, the rack member will not accidentally disengage, being held secured by the angular portion 40. The locking device 35 may be easily released by merely lifting the rack member 36.

It will now be seen that the device provides a plurality of jaws and interconnecting means affording a compound pivotal motion for at least one of the jaws. Preferably this compound motion is composed of individual component movements, one of which is about the horizontal pivot 18, and the other is about an upright axis furnished by the device 30 whose axis is at right angles to that of the pivot 18. It is further noted that the device 30 is preferably between the jaw member 11 and the pivot axis 18, and that the locking device 35 is in a convenient position remote from the handles 16 and 17, and below the pivot 18, but above the device 30 so as not to be affected by the operation of the latter. Preferably one of the jaws is rigid on its handle bar in order to avoid a wabbly operation of the appliance 10. These jaws are horizontally elongated in the direction of the pivot axis 18 and they are of suitable size and proper form to radially grip a roast therebetween. The handle bars 14 and 15 and the device 30 are preferably between the ends of the jaws so that when the jaw 11 moves about its upright axis, the space between the jaws at one end thereof diminishes, while at the opposite end of the jaws, the space therebetween simultaneously increases. There is a balanced and uniform pressure condition on the roast substantially throughout the length thereof, except that the pressure of the jaw 11 may be somewhat greater at the wider end of the roast due to the action of the spring 31. The latter are maintained along horizontal parallel lines by the spring 31, thus facilitating the entrance of the appliance into the baking pan of the roast. The substantially concaved jaw 12 may be entered first into the above, and as it engages somewhat below the roast, the appliance may be swung to enter the jaw 11, but any other procedure may be followed. Now the operator presses the handles 16 and 17 together snugly gripping the roast, with the appliance automatically locked by the device 35. The roast may now be safely lifted and the appliance may then be swung to a horizontal position with the jaw 12 lowermost to form an adequate support for the roast and preclude any possibility of the latter slipping from between the jaws. Such slipping is substantially prevented by the points 21, but additional securement may be furnished by the end walls or flanges 22 which form the jaw 12 into a shallow container adapted to retain any gravy that drips down from the roast, as the same is being moved into position over a serving dish. Now the appliance may be tilted back to upright position as shown in the drawing, and the locking device 35 which was reliably secured by the angular toothlike portion 40, is easily released, while the roast is permitted to gradually ease out of the container portion 12 and into the serving dish. The arrangement is such that it is unnecessary to pry the roast loose from any prongs or teeth such as 21, because the roast disengages itself by its own weight from the prongs 21, and the jaw 12 may be wholly smooth so that the roast readily slides therefrom into the serving dish. By the structure shown there is no possibility of accidental tearing or ripping of the roast, as would be the case if relatively long prongs were employed, and which would have the further drawback of requiring considerable extra space in engaging the tong device with the roast in the baking pan.

We claim:

1. A meat roast lifter comprising a pair of elongated arms pivoted at a midportion on a first axis, said arms having hand gripping ends on the same side of said pivot, jaws carried by ends of said arms on the side of said pivot opposite said hand gripping ends arranged to clamp a meat roast when said hand gripping ends are pressed toward each other, each of said jaws being elongated in a direction parallel to said first axis, one of said jaws being carried to pivot on a second axis normal to said first axis and in alignment with respect to the length of its arm to permit variation in the spacing between said jaws in their elongated direction to accommodate differently shaped roasts, the other jaw being rigidly mounted to its arm for cooperation with said pivoted jaw.

2. The meat roast lifter as defined in claim 1 having resilient means between said pivoted jaw and its arm to normally maintain the elongation of said last mentioned jaw in a parallel relation with respect to the elongation of said rigid jaw.

3. A meat roast lifter including a plurality of opposite jaws, interconnecting elongated arms therebetween having a horizontal pivot, one jaw being mounted on one of the arms in alignment with respect to the longitudinal axis thereof for angular movement thereabout, the other jaw being rigid on its arm for cooperating with said pivoted jaw.

4. A device including opposed horizontally elongated jaws, pivotally interconnected arms connected to the jaws for relative swinging movement of the latter about a horizontal axis, one arm including interconnected sections journalled together along an upright axis for angular movement of the jaw carried thereby, and spring means carried by one section and engaging the other section to resist such angular movement and to cause the jaws to be approximately parallel to each other in the horizontal direction.

5. The meat roast lifter as defined in claim 3 in which said rigid jaw is formed as a shallow container for a roast and its juices, and the pivotally mounted jaw is formed with projections to grip the roast to hold same from sliding from said rigid jaw.

LENA E. ZWOBODA.
ARTHUR E. ZWOBODA.

REFERENCES CITED

The following references are of record in the file of this patent:

UNITED STATES PATENTS

| Number | Name | Date |
| --- | --- | --- |
| 1,538,536 | Wisoff | May 19, 1925 |
| 1,742,232 | Casale | Jan. 7, 1930 |

FOREIGN PATENTS

| Number | Country | Date |
| --- | --- | --- |
| 15,297 | Great Britain | July 1, 1912 |